US012580211B2

(12) United States Patent
Sakai

(10) Patent No.: US 12,580,211 B2
(45) Date of Patent: Mar. 17, 2026

(54) FUEL CELL SYSTEM

(71) Applicant: HONDA MOTOR CO., LTD., Tokyo (JP)

(72) Inventor: Ryoji Sakai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 401 days.

(21) Appl. No.: 17/843,482

(22) Filed: Jun. 17, 2022

(65) Prior Publication Data

US 2022/0416279 A1     Dec. 29, 2022

(30) Foreign Application Priority Data

Jun. 24, 2021    (JP) ................................. 2021-105027

(51) Int. Cl.
H01M 8/04858 (2016.01)
H01M 8/04537 (2016.01)

(52) U.S. Cl.
CPC ... H01M 8/04932 (2013.01); H01M 8/04552 (2013.01); H01M 8/04582 (2013.01); H01M 8/04611 (2013.01); *H01M 2250/20* (2013.01)

(58) Field of Classification Search
CPC ......... H01M 8/04932; H01M 8/04552; H01M 8/04582; H01M 8/04611; H01M 2250/20; H01M 8/04679; H01M 8/04955; Y02E 60/50; H02H 5/00
See application file for complete search history.

(56) References Cited

U.S. PATENT DOCUMENTS

| | | | | |
|---|---|---|---|---|
| 2019/0123542 A1* | 4/2019 | Kambham | ........... | G01R 31/007 |
| 2021/0098806 A1 | 4/2021 | Sakai et al. | | |

FOREIGN PATENT DOCUMENTS

| | | | | | |
|---|---|---|---|---|---|
| CN | 206797136 U | * | 12/2017 | ................ | B60L 3/04 |
| CN | 111279571 A | | 6/2020 | | |
| JP | 2003203663 A | * | 7/2003 | | |
| JP | 2006236739 A | * | 9/2006 | ........ | H01M 8/04559 |
| JP | 2008-279978 A | | 11/2008 | | |
| JP | 2009032615 A | * | 2/2009 | | |
| JP | 2010192256 A | * | 9/2010 | | |

(Continued)

OTHER PUBLICATIONS

English translation of JP-2010192256-A (Year: 2010).*

(Continued)

*Primary Examiner* — Ula C Ruddock
*Assistant Examiner* — Sarika Gupta
(74) *Attorney, Agent, or Firm* — Carrier, Shende & Associates P.C.; Joseph P. Carrier; Jeffrey T. Gedeon

(57) ABSTRACT

A fuel-cell-applied system includes a control device configured to control power generation of the fuel cell, a power conversion device configured to convert power generated by the fuel cell into power for input to a load, an isolation device configured to irreversibly disconnect electrical connection between the fuel cell and the power conversion device, a first detector configured to detect an output power state form the fuel cell, and a second detector configured to detect an input power state to the power conversion device, wherein the control device detects a disconnected state of the electrical connection caused by the isolation device on a basis of the output power state and the input power state respectively detected by the first detector and the second detector.

2 Claims, 9 Drawing Sheets

(56) References Cited

FOREIGN PATENT DOCUMENTS

| JP | 2021-501551 A | 1/2021 |
| JP | 2021-057128 A | 4/2021 |

OTHER PUBLICATIONS

English translation of JP2006236739A (Year: 2006).*
English translation of JP2003203663A (Year: 2003).*
English translation of JP-2009032615-A (Year: 2009).*
English translation of CN-206797136-U (Year: 2017).*
Office Action dated Jan. 24, 2023 issued over the corresponding Japanese Patent Application No. 2021-105027 with the English translation thereof.
Office Action and Search Report dated May 24, 2025 issued in the corresponding Chinese Patent Application No. 202210694298.5 with the English machine translation thereof.

* cited by examiner

FUEL CELL SYSTEM

CROSS-REFERENCE TO RELATED APPLICATIONS

This application is based upon and claims the benefit of priority from Japanese Patent Application No. 2021-105027 filed on Jun. 24, 2021, the contents of which are incorporated herein by reference.

BACKGROUND OF THE INVENTION

Field of the Invention

The present invention relates to a fuel cell system including a fuel cell and a power conversion device that converts electric power generated by the fuel cell into electric power for load input.

Description of the Related Art

For example, JP 2021-057128 A discloses a fuel cell system including a DC-DC converter that converts electric power generated by a fuel cell into electric power for input to a motor (see [0056], FIG. 4 of JP 2021-057128 A).

Here, the motor corresponds to a load of the fuel cell, and the DC-DC converter corresponds to a power conversion device.

In an electric vehicle with a fuel cell system, in order to isolate the fuel cell from the load in case of a collision, the following measures are considered.

For example, an isolation device is inserted between the fuel cell and the power conversion device. The isolation device includes a current conduction path (conductor).

As the isolation device, for example, there is an electromagnetic contactor (contactor) capable of reversibly connecting and disconnecting the current conduction path.

As the isolation device, for example, there is also a pyro-fuse (JP 2021-501551 A) which irreversibly disconnects the current conduction path.

The pyro-fuse has a mechanism for physically cutting the current conduction path in case of collision or the like. Thus, the electrical connection (circuit) between the fuel cell and the power conversion device is physically cut (the electrical connection is irreversibly disconnected).

SUMMARY OF THE INVENTION

In the fuel cell system, when the isolation device is brought into an interrupting state (operating state), a portion between the positive electrode output terminal and the negative electrode output terminal (between the output terminals) of the fuel cell becomes opened.

The fuel cell is restarted by turning a power switch of a fuel cell system from an OFF state to an ON state again in the state where the output terminals of the fuel cell are opened. When the power generation of the fuel cell is resumed after the restart, the power generation voltage of the fuel cell rises to the OCV (open circuit voltage). This causes problems such as deterioration (high-potential deterioration) of the fuel cell.

In addition, since the output terminals of the fuel cell are opened, the power generated by the fuel cell cannot be supplied to a battery (capacitor) or a motor, and the user cannot be notified of the situation.

In order to solve these problems, the following countermeasures can be considered.

The fuel cell system records the fact that the isolation device is put into the interrupting state in a nonvolatile memory as circuit disconnection information. The fuel cell system checks the recorded contents (circuit disconnection information) of the nonvolatile memory at the time of restart and controls the fuel cell so as not to resume its operation. This control can prevent the power generation voltage of the fuel cell from increasing to the OCV. Due to this control, the generated voltage actually increases only in the vicinity of 0 volts.

However, in the fuel cell system, there are problems that the memory capacity of the nonvolatile memory is tight and that a reset process of the circuit disconnection information recorded in the nonvolatile memory is complicated.

Further, even if the nonvolatile memory is enabled to record the circuit disconnection information of the isolation device therein, the circuit disconnection information is still not recorded in the nonvolatile memory in case of a malfunction of the isolation device itself.

An object of the present invention is to solve the above-described problems.

A fuel cell system according to an aspect of the present invention includes a fuel cell, a control device configured to control power generation of the fuel cell, a power conversion device configured to convert power generated by the fuel cell into power for input to a load, an isolation device configured to irreversibly disconnect electrical connection between the fuel cell and the power conversion device, a first detector configured to detect an output power state form the fuel cell, and a second detector configured to detect an input power state to the power conversion device, wherein the control device detects a disconnected state of the electrical connection caused by the isolation device on a basis of the output power state and the input power state respectively detected by the first detector and the second detector.

According to the present invention, it is possible to detect the irreversibly disconnected state of the electrical connection between the fuel cell and the power conversion device (circuit disconnected state), without using a nonvolatile memory. As a result, the shortage of the capacity of the nonvolatile memory can be avoided, and the reset process of the circuit disconnection information recorded in the non-volatile memory can be made unnecessary. The circuit disconnected state is reliably detectable even when the isolation device itself malfunctions.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

[Configuration]

Figure 1:
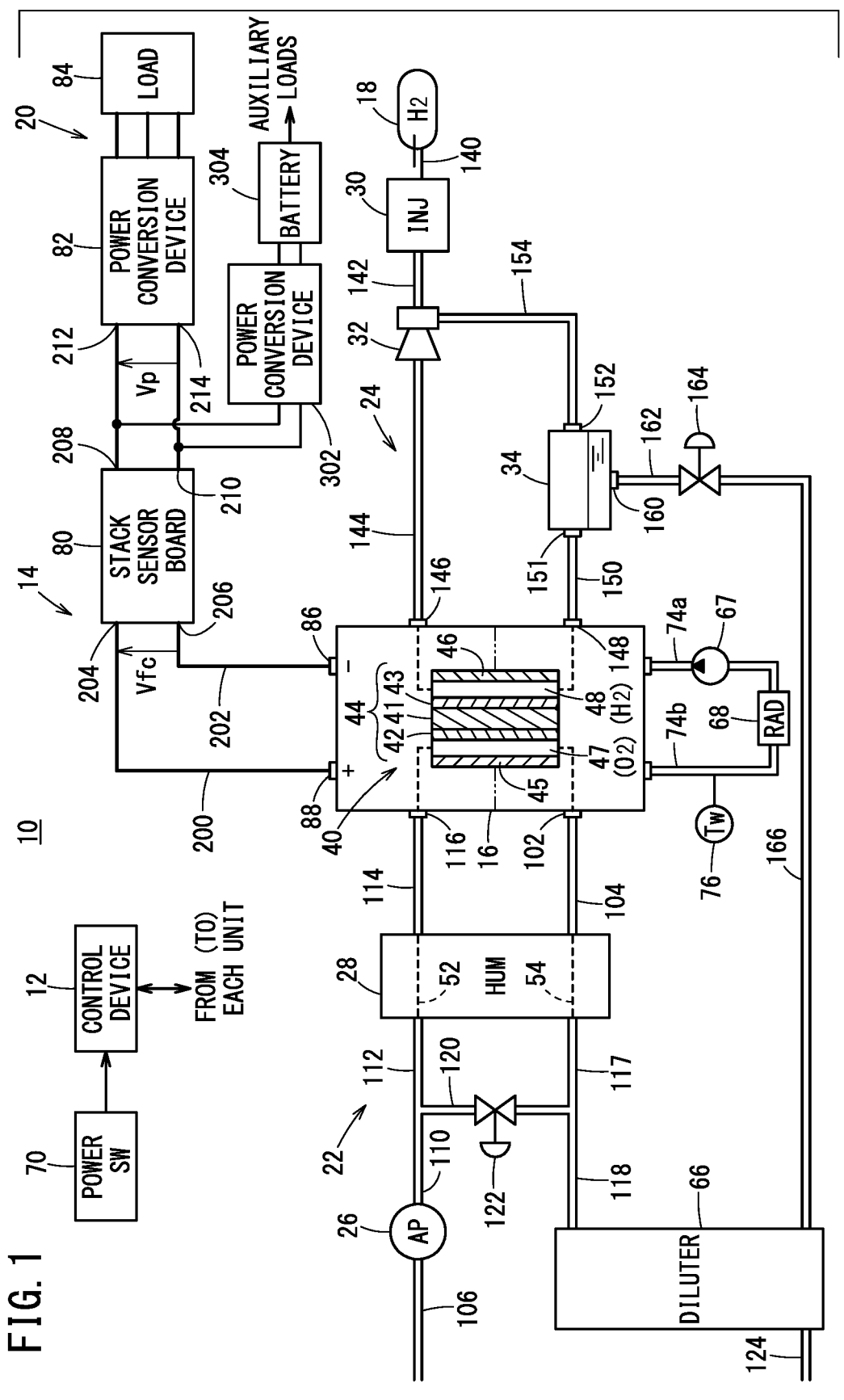
FIG. 1 is a schematic circuit block diagram illustrating a configuration of a fuel-cell-applied system in which a fuel cell system according to an embodiment is incorporated.

FIG. 1 is a schematic circuit block diagram illustrating a configuration of a fuel-cell-applied system 10 in which a fuel cell system 14 according to an embodiment is incorporated.

The fuel-cell-applied system 10 includes a control device 12, the fuel cell system 14, and an output unit 20. The output unit 20 is electrically connected to the fuel cell system 14. The output unit 20 includes a load 84 and a power conversion device 82. The power conversion device 82 allows bi-directional power flow. Rather than being bi-directional, the power conversion device 82 may be uni-directional such that power is directed from the fuel cell system 14 to the load 84.

In the case where the load 84 is a traction motor, the fuel-cell-applied system 10 functions as a fuel cell vehicle (electric vehicle). In this case, the power conversion device 82 includes a DC-DC converter and an inverter. The DC-DC converter generates a boosted DC voltage obtained by boosting a DC input voltage Vp. The inverter converts the boosted DC voltage into three phase AC power and supplies the AC power to the load 84. Depending on the specifications of the load 84, the DC-DC converter or inverter may be omitted from the power conversion device 82.

The fuel cell system 14 basically includes a fuel cell stack (also simply referred to as a fuel cell) 16, a hydrogen tank 18, an oxygen-containing gas system device 22, a fuel gas system device 24, and a stack sensor board 80.

The oxygen-containing gas system device 22 includes an air pump 26 and a humidifier (HUM) 28.

The fuel gas system device 24 includes an injector (INJ) 30, an ejector (EJT) 32, and a gas-liquid separator 34.

In the fuel cell stack 16, a plurality of power generation cells 40 are stacked. Each of the power generation cells 40 includes a membrane electrode assembly 44, and a pair of separators 45, 46 that sandwich the membrane electrode assembly 44.

The membrane electrode assembly 44 includes a solid polymer electrolyte membrane 41, a cathode 42, and an anode 43. The solid polymer electrolyte membrane 41 is formed by impregnating a thin membrane of perfluorosulfonic acid with water, for example. The cathode 42 and the anode 43 sandwich the solid polymer electrolyte membrane 41.

Each of the cathode 42 and the anode 43 has a gas diffusion layer (not shown) made from carbon paper or the like. Porous carbon particles are deposited uniformly on the surface of the gas diffusion layer, and platinum alloy is supported on surfaces of the carbon particles. Thus, an electrode catalyst layer (not shown) is formed. The electrode catalyst layer is formed on both surfaces of the solid polymer electrolyte membrane 41, respectively.

A gap between a surface of one separator 45 facing the membrane electrode assembly 44 and a surface of the electrode catalyst layer of the cathode 42 facing the separator 45 is formed as a cathode flow field (oxygen-containing gas flow field) 47. The cathode flow field 47 connects an oxygen-containing gas inlet communication hole 116 and an oxygen-containing gas outlet communication hole 102.

A gap between a surface of the other separator 46 facing the membrane electrode assembly 44 and a surface of the electrode catalyst layer of the anode 43 facing the separator 46 is formed as an anode flow field (fuel gas flow field) 48. The anode flow field 48 connects a fuel gas inlet communication hole 146 and a fuel gas outlet communication hole 148.

When the fuel gas is supplied to the anode 43, hydrogen ions are generated from hydrogen molecules by electrode reaction caused by catalyst. The hydrogen ions pass through the solid polymer electrolyte membrane 41 and move to the cathode 42, while electrons are released from the hydrogen molecules.

The electrons released from hydrogen molecules move from a negative electrode terminal 86 to the positive electrode terminal 88 through the stack sensor board 80, the output unit 20, and the like, and then to the cathode 42.

At the cathode 42, by action of the catalyst, hydrogen ions and electrons, and oxygen contained in the supplied oxygen-containing gas are reacted to produce water.

A power generation voltage (stack voltage, output voltage) Vfc is applied between the positive electrode terminal 88 and the negative electrode terminal 86 of the fuel cell stack 16 by an electrochemical reaction between the oxygen-containing gas and the fuel gas in the stacked power generation cells 40. A high power generation voltage Vfc of the fuel cell stack 16 in which a plurality of power generation cells 40 are electrically connected in series is applied to input terminals 204, 206 of the stack sensor board 80 via a positive electrode conductor 200 and a negative electrode conductor 202.

Each of the positive electrode conductor 200 and the negative electrode conductor 202 is formed of a bus bar or the like through which a large amount of current can flow.

The voltage between output terminals 208, 210 of the stack sensor board 80 is applied to the power conversion device 82 as an input voltage Vp between input terminals 212, 214 of the power conversion device 82.

Figure 2:
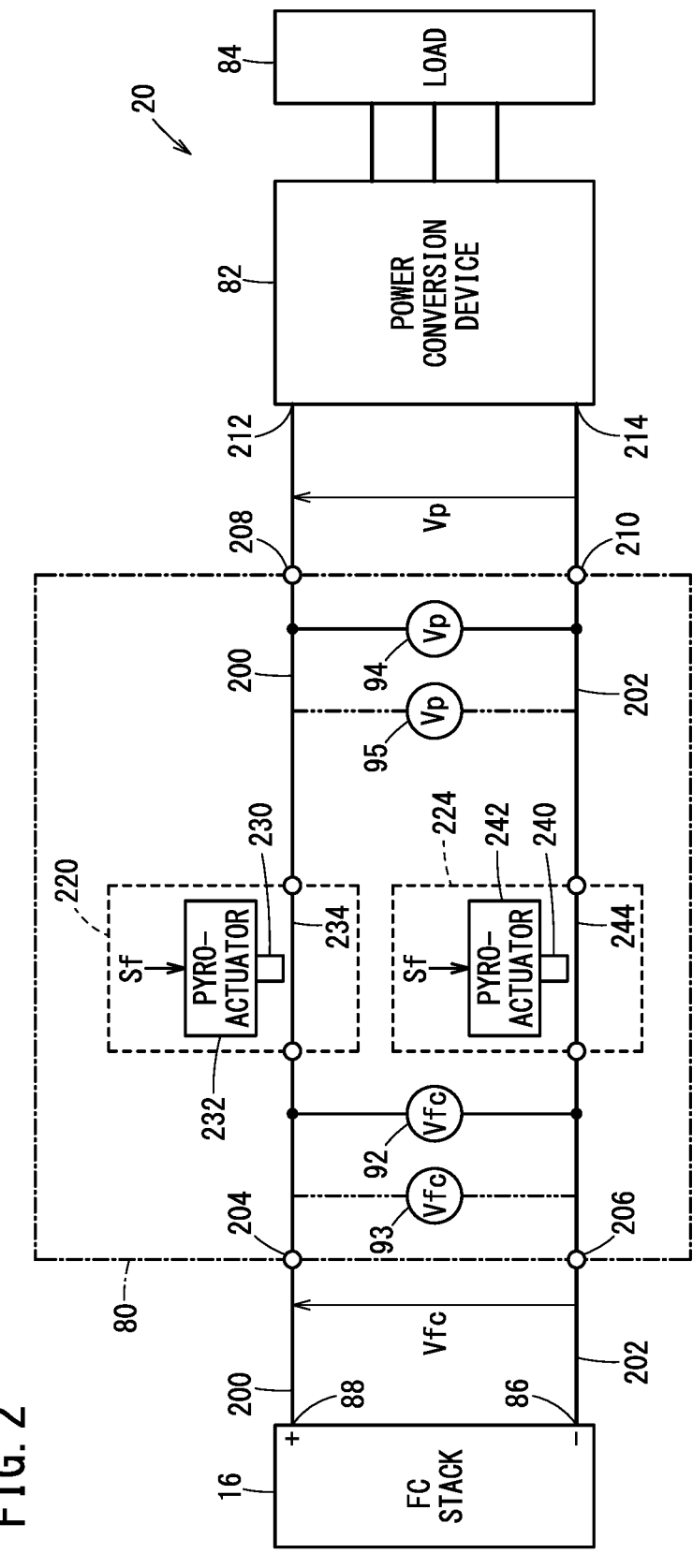
FIG. 2 is a circuit block diagram illustrating a detailed circuit configuration (isolation device not operated) of the stack sensor board shown in FIG. 1.

FIG. 2 is a view of a detailed circuit configuration of the stack sensor board 80 including the input terminals 204, 206 connected to the fuel cell stack (FC stack) 16 and the output terminals 208, 210 connected to the power conversion device 82.

As shown in FIG. 2, the positive electrode conductor 200 extends from the positive electrode terminal 88 of the fuel cell stack 16 to the input terminal 212 of the power conversion device 82. The negative electrode conductor 202 extends from the negative electrode terminal 86 of the fuel cell stack 16 to the input terminal 214 of the power conversion device 82.

An isolation device (breaker) 220 such as a pyro-fuse and the like is disposed in the positive electrode conductor 200. An isolation device (breaker) 224 such as a pyro-fuse and the like is disposed in the negative electrode conductor 202.

The isolation device 220 has a bus bar (conductor track) 234 through which current flows. The bus bar 234 is connected to the positive electrode conductor 200 if not disconnected.

The isolation device 220 further includes a pyro-actuator 232. In case of collision or the like, the pyro-actuator 232 causes a piston 230 to protrude toward the bus bar 234 by gas pressure, in response to an ignition signal Sf supplied from the control device 12 or the like, and thus the bus bar 234 is disconnected. The control device 12 or the like detects an impact of collision by an acceleration sensor or the like (not shown).

Similarly, the isolation device 224 has a bus bar (conductor track) 244 through which current flows. The bus bar 244 is connected to the positive electrode conductor 202 if not disconnected.

The isolation device 224 further includes a pyro-actuator 242. In case of collision or the like, the pyro-actuator 242 causes a piston 240 to protrude toward the bus bar 244 by gas pressure, in response to an ignition signal Sf supplied from the control device 12 or the like, and thus the bus bar 244 is disconnected.

When the bus bars 234, 244 of the isolation devices 220, 224 are disconnected in case of collision or the like, electrical connection between the fuel cell stack 16 and the power conversion device 82 is changed from a conductive state (a connected state or a non-disconnected state) to an irreversibly disconnected state.

That is, the isolation devices 220, 224 are operated in case of collision or the like to physically cut the electrical connection (circuit) between the fuel cell stack 16 and the power conversion device 82.

Figure 3:
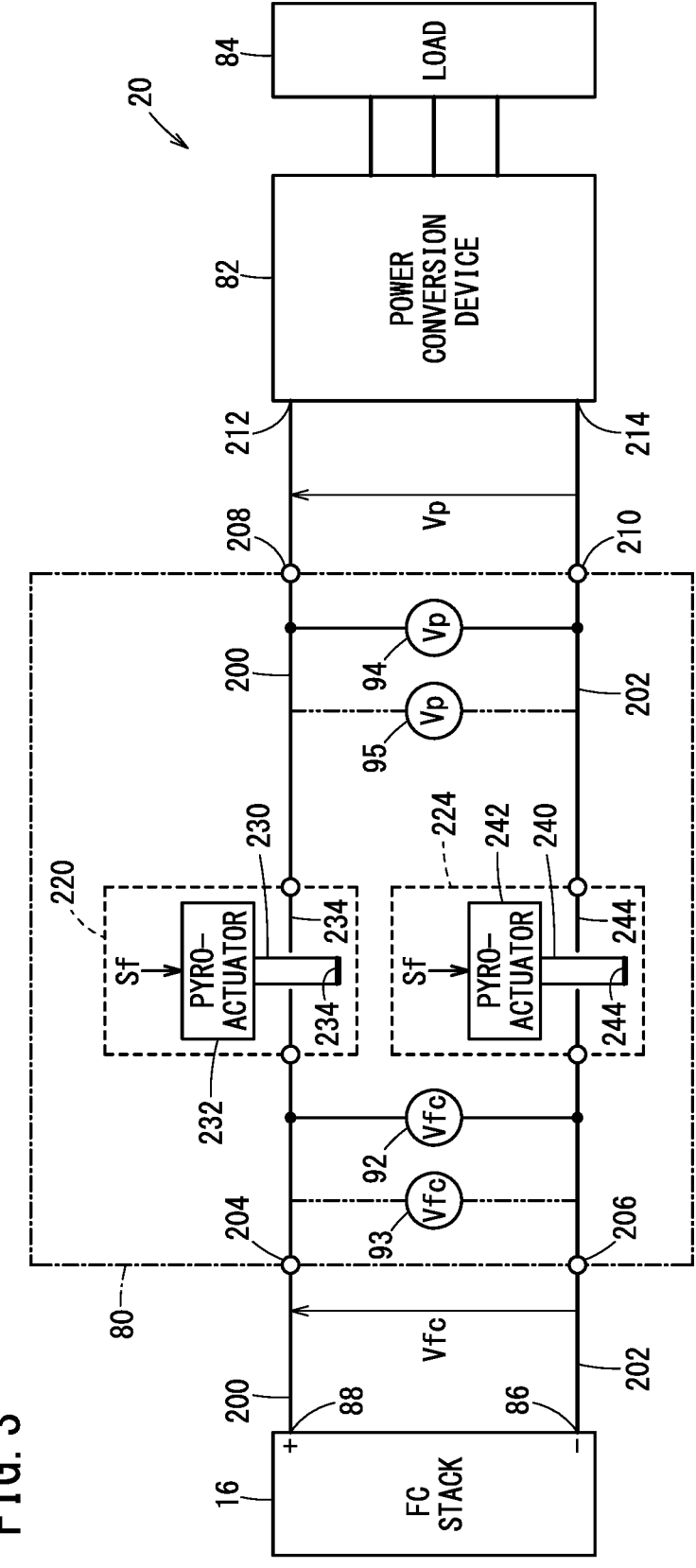
FIG. 3 is a circuit block diagram illustrating a detailed circuit configuration (isolation device operated) of the stack sensor board shown in FIG. 1.

FIG. 3 is a circuit configuration in which the isolation devices 220, 224 operate to cut the electrical connection between the fuel cell stack 16 and the power conversion device 82 (disconnect the bus bars 234, 244).

As shown in FIGS. 2 and 3, in the stack sensor board 80, a voltage sensor 92 (first detection unit, first detector) is provided between the positive electrode conductor 200 and the negative electrode conductor 202 near the fuel cell stack 16. As indicated by a two dot chain line, a voltage sensor 93 (first detection unit, first detector) may be provided as a redundant sensor in parallel with the voltage sensor 92. The voltage sensors 92, 93 detect (measure) a power generation voltage Vfc generated between the positive electrode terminal 88 and the negative electrode terminal 86.

In the stack sensor board 80, a voltage sensor 94 (second detection unit, second detector) is provided between the positive electrode conductor 200 and the negative electrode conductor 202 near the power conversion device 82. As indicated by a two dot chain line, a voltage sensor 95 (second detection unit, second detector) may be provided as a redundant sensor in parallel with the voltage sensor 94.

The voltage sensors 94, 95 detect (measure) an input voltage Vp between the input terminal 212 and the input terminal 214 of the power conversion device 82. In this case, the voltage sensors 94, 95 may be disposed outside the stack sensor board 80 and between the output terminals 208, 210 of the stack sensor board 80 and the input terminals 212, 214 of the power conversion device 82. The voltage sensors 94, 95 may be disposed between the input terminals 212, 214 of the power conversion device 82.

Referring back to FIG. 1, the air pump 26 includes a mechanical supercharger driven by a pump driving motor (not shown).

The air pump 26 takes in air from the outside (atmosphere) to a suction port through a pipe 106 by the supercharger, pressurizes the air to generate compressed air, and discharges the compressed air from a discharge hole. That is, the air pump 26 has a function of supplying compressed air as an oxygen-containing gas to the humidifier 28.

The humidifier 28 has a flow path 52 and a flow path 54. The oxygen-containing gas (dry air) flows through the one flow path 52. A moist exhaust gas flows through the other flow path 54. The moist exhaust gas flows from the cathode flow field 47 of the fuel cell stack 16 through the oxygen-containing gas outlet communication hole 102 and a pipe 104.

The humidifier 28 has a function of humidifying the oxygen-containing gas supplied from the air pump 26. That is, the humidifier 28 transfers water contained in the exhaust gas to a supply gas (oxygen-containing gas) via a porous membrane (not shown) between the flow path 52 and the flow path 54.

The discharge hole of the air pump 26 communicates with one end of the flow path 52 of the humidifier 28 through pipes 110, 112. The other end of the flow path 52 of the humidifier 28 communicates with one end of a pipe 114 (oxygen-containing gas supply channel), and the other end of the pipe 114 communicates with the cathode flow field 47 in the fuel cell stack 16 through the oxygen-containing gas inlet communication hole 116.

A discharge hole of the flow path 54 of the humidifier 28 communicates with one of inlets of a diluter 66 through pipes 117, 118.

The pipe 110 connected to the discharge hole of the air pump 26 is branched, and one branched pipe communicates with the pipe 112, and the other branched pipe communicates with the pipes 117, 118 via a bypass pipe 120 and a bypass valve 122.

A hydrogen tank 18 is a container including a solenoid shut-off valve (not shown), and stores highly pure hydrogen compressed under high pressure.

When the shut-off valve is opened, the fuel gas discharged from the hydrogen tank 18 passes through a pipe 140, the injector 30, a pipe 142, the ejector 32, a pipe 144 (fuel gas supply channel), and is supplied to the inlet of the anode flow field 48 via the fuel gas inlet communication hole 146.

The outlet of the anode flow field 48 communicates with an inlet 151 of the gas-liquid separator 34 through a fuel gas outlet communication hole 148 and a pipe 150 (fuel exhaust gas passage). Thus, the fuel exhaust gas (anode off-gas), which is a hydrogen-containing gas, is supplied from the anode flow field 48 to the inlet 151 of the gas-liquid separator 34.

The gas liquid separator 34 separates the fuel exhaust gas into gas component and liquid component (liquid water). The gas component of the fuel exhaust gas (anode off-gas) is discharged from a gas discharge hole 152 of the gas liquid separator 34 and supplied to the ejector 32 through a pipe 154.

A fuel gas is supplied to the ejector 32 from the injector 30 provided on the upstream side of the ejector 32, through the pipe 142. Therefore, the fuel exhaust gas (the gas component) supplied through the pipe 154 via the gas-liquid separator 34 is sucked by the ejector 32 and mixed with the fuel gas. The mixed gas of the fuel gas and the fuel exhaust gas is supplied from the ejector 32 to the anode flow field 48 through the pipe 144 and the fuel gas inlet communication hole 146.

The liquid component of the fuel exhaust gas separated by the gas-liquid separator 34 is supplied from a liquid discharge hole 160 of the gas-liquid separator 34 to the other of the inlets of the diluter 66 through a pipe 162, a drain valve 164, and a pipe 166.

A part of the fuel exhaust gas is discharged from the drain valve 164 to the pipe 166 together with the liquid component. In order to dilute the hydrogen gas in the fuel exhaust gas and discharge the diluted gas to the outside (atmosphere), a part of the oxygen-containing gas discharged from the air pump 26 is supplied to the one of the inlets of the diluter 66 through the bypass pipe 120 and the pipe 118.

Therefore, the hydrogen gas in the fuel exhaust gas is diluted by the oxygen-containing gas in the diluter 66, and the diluted hydrogen gas is discharged to the outside (atmosphere) via a pipe 124.

The fuel cell system 14 further includes a coolant supply channel 74a and a coolant discharge channel 74b for supplying and discharging a coolant to and from a coolant flow field (not shown) provided in the fuel cell stack 16. A temperature sensor 76 is provided near the fuel cell stack 16 in the coolant discharge channel 74b. The temperature sensor 76 detects (measures) the temperature Tw [° C.] of the coolant flowing through the coolant discharge channel 74b. The temperature Tw of the coolant discharged from the fuel cell stack 16 and flowing through the coolant discharge channel 74b is used as an estimate of a temperature (internal temperature) of the fuel cell stack 16.

A circulation pump 67 for circulation of the coolant and a radiator (RAD) 68 for cooling the coolant are provided between the coolant supply channel 74a and the coolant discharge channel 74b. The radiator 68 may be provided with a fan for forcibly cooling the radiator 68.

The control device 12 is configured as an ECU (electronic control unit) including a microcomputer provided with a CPU (not shown), a storage unit (ROM and RAM), a timer/counter, and the like.

The storage unit stores control programs and the like of the fuel-cell-applied system 10 and the fuel cell system 14.

The CPU of the control device 12 performs operation control of the fuel-cell-applied system 10 and the fuel cell system 14 by executing calculation according to the control programs.

A power switch (power SW) 70 for turning on and off the fuel-cell-applied system 10 and the fuel cell system 14 is connected to the control device 12.

When the power switch 70 is in an ON state, the control device 12 performs power generation control of the fuel cell system 14 by performing drive control of each component constituting the oxygen-containing gas system device 22 and the fuel gas system device 24 based on detected values from each unit (various sensors and the like).

Further, the control device 12 detects an operating or non-operating state of the isolation devices 220, 224 at the time of restart when the power switch 70 is switched from the OFF state to the ON state. Two or more control devices 12 may be used.

As shown in FIG. 1, the voltage (the input voltage Vp) between the output terminals 208, 210 of the stack sensor board 80 is also applied between the input terminals of another bidirectional power conversion device 302. The output terminals of the power conversion device 302 are connected to a battery 304 (capacitor).

The battery 304 is charged with electric power generated by the fuel cell stack 16 via the stack sensor board 80 and the power conversion device 302. The battery 304 supplies the electric power to auxiliary loads and the like of the fuel cell system 14. The auxiliary loads include the control device 12, the air pump 26, the injector 30, the circulation pump 67, an air conditioner (not shown), and the like.

[Operation]

Figure 4:
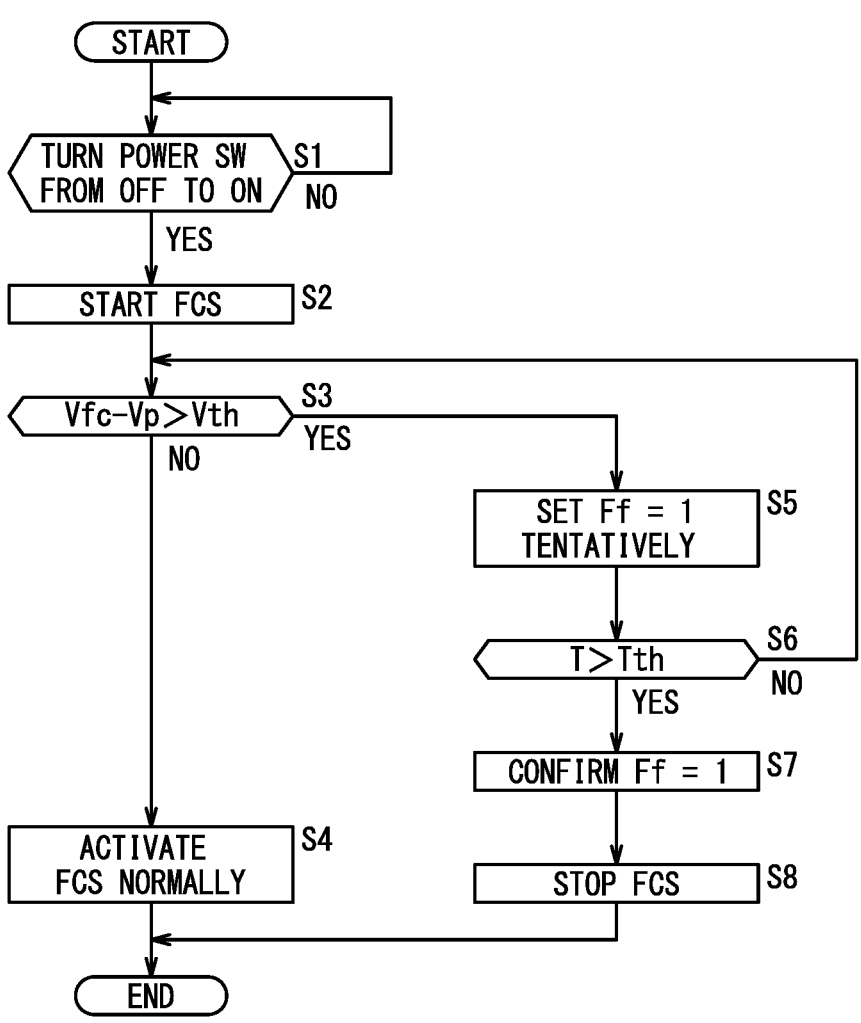
FIG. 4 is a flowchart for explaining a start-up operation of the fuel cell system.

Operations of the fuel-cell-applied system 10 including the fuel cell system 14 basically configured as described above will be described with reference to the flowchart of FIG. 4. The CPU of the control device 12 executes the program regarding the process in the flow chart. However, for the sake of convenience, reference to the control device 12 will be made only when necessary.

In step S1, the control device 12 determines whether or not the power switch 70 has switched from the OFF state to the ON state. When the control device 12 detects the switching to the ON state (step S1: YES), in step S2, the control device 12 starts the fuel cell system (FCS) 14.

At the start-up, the control device 12 sets a target power generation voltage Vtar of the fuel cell stack 16. The target power generation voltage Vtar is set such that the power generated by the fuel cell stack 16 is equal to or lower than a predetermined value.

The target power generation voltage Vtar is a voltage sufficiently lower than an open circuit voltage OCV (hereinafter referred to as "open circuit voltage Vocv") that accelerates high-potential deterioration of the fuel cell stack 16.

In the idling state after the start-up, the bypass valve 122 is opened mainly for dilution when the drain valve 164 is opened.

After step S2, in the oxygen-containing gas system device 22, the oxygen-containing gas discharged from the air pump 26, which starts to operate using the electric power of the battery 304 as a power source, is supplied to the oxygen-containing gas inlet communication hole 116 of the fuel cell stack 16 through the pipes 110, 112, the humidifier 28, and the pipe 114.

On the other hand, in the fuel gas system device 24, the injector 30 is opened at a predetermined duty, and when the injector 30 is opened, the fuel gas (hydrogen gas) is supplied from the high-pressure hydrogen tank 18 to the pipe 142. This fuel gas is mixed with the fuel exhaust gas sucked into the ejector 32 through the pipe (circulation path) 154. The fuel gas mixed with the fuel exhaust gas passes through the ejector 32, and then is supplied to the fuel gas inlet communication hole 146 of the fuel cell stack 16.

In the fuel cell stack 16, the oxygen-containing gas is supplied from the oxygen-containing gas inlet communication hole 116 to the cathode 42 through the cathode flow field 47 of each power generation cell 40. On the other hand, the hydrogen gas is supplied from the fuel gas inlet communication hole 146 to the anode 43 through the anode flow field 48 of each power generation cell 40. Accordingly, in each of the power generation cells 40, the oxygen gas contained in the air supplied to the cathode 42 and the hydrogen gas supplied to the anode 43 are consumed in electrochemical reactions (fuel cell reaction) at the electrode catalyst layer to perform power generation.

The cathode exhaust gas composed of the air which has been supplied to the cathode 42 and in which oxygen has been consumed, and the reaction product water are discharged to the oxygen-containing gas outlet communication hole 102.

The cathode exhaust gas and the reaction product water discharged from the oxygen-containing gas outlet communication hole 102 are discharged to the outside (atmosphere) from the fuel cell system 14 through the pipe 104, the flow path 54, the pipes 117, 118, the diluter 66, and the pipe 124.

On the other hand, the hydrogen gas supplied to and consumed at the anode 43 is discharged to the fuel gas outlet communication hole 148 as a fuel exhaust gas (partially consumed fuel gas).

The fuel exhaust gas discharged from the fuel gas outlet communication hole 148 is introduced into the gas-liquid separator 34 through the pipe 150. The gas-liquid separator 34 separates liquid component (liquid water) from the fuel exhaust gas. The fuel exhaust gas from which the liquid component (liquid water) has been removed is sucked by the ejector 32 through the pipe 154 and is used for the power generation reactions in the fuel cell stack 16.

During idling, the high-voltage power generated by the fuel cell stack 16 with a power generation voltage Vfc is supplied to the auxiliary loads such as the air pump 26 and the like through the positive electrode conductor 200 and the negative electrode conductor 202 in the stack sensor board 80, the electric power conversion device 302, and the battery 304.

Next, the control device 12 determines whether or not the isolation devices 220, 224 are operated. To this end, first, in step S3, a voltage difference (Vfc–Vp) between the power generation voltage Vfc detected by the voltage sensor 92 and the input voltage Vp detected by the voltage sensor 94 is calculated. In step S3, it is determined whether or not the calculated voltage difference (Vfc–Vp) exceeds a threshold-voltage Vth.

If the isolation devices 220, 224 are in the non-operating state (circuit conducting state, see FIG. 2), the voltage difference (Vfc–Vp) is 0 volts. When the isolation devices 220, 224 are in the operating state (circuit disconnected state, see FIG. 3), the input voltage Vp is 0 volts, and the generated voltage Vfc rises to the open circuit voltage Vocv. The threshold voltage Vth is set to a voltage value between the target power generation voltage Vtar and the open circuit voltage Vocv, for example.

In step S3, when the voltage difference (Vfc–Vp) is lower than the threshold voltage Vth (step S3: NO), the control device 12 determines that the isolation devices 220, 224 are in the non-operating state (circuit conducting state, see FIG. 2). In this case, the control device 12 normally activates the fuel cell system 14 in step S4.

The completion of the normal activation (normal start-up operation) in step S4 is determined based on, for example, a passage of time from a time point at which the power generation voltage Vfc reaches the target power generation voltage Vtar to a time point at which a specified time set according to the coolant temperature Tw measured by the temperature sensors 76 has elapsed.

On the other hand, when it is determined in step S3 that the voltage difference (Vfc–Vp) is greater than the threshold voltage Vth (step S3: YES), the process proceeds to step S5.

In this step S5, assuming that the isolation devices 220, 224 are in the operating state (circuit disconnected state), a disconnection flag Ff indicating the blown state of the isolation devices 220, 224 is tentatively set to Ff=1.

Next, in step S6, the control device 12 determines whether or not the determination (YES) in step S3 is established for a threshold time (predetermined time) Tth (about several seconds) (T>Tth).

When the clocking determination in step S6 is established (step S6: YES), in step S7, the control device 12 determines that the isolation devices 220, 224 are in the operating state (circuit disconnected state, refer to FIG. 3), and makes a final determination that the disconnection flag Ff indicating the blown state of the isolation device 220 is Ff=1.

In step S8, the control device 12 stops the air pump 26, closes the shut-off valve of the hydrogen tank 18, and stops the fuel cell system 14.

As described above, according to the above-described embodiment, at the time of switching of the power switch 70 from the OFF state to the ON state (at the time of restart), the control device 12 can detect the irreversibly disconnected state of the electrical connection caused by the isolation devices 220, 224 (circuit disconnected state) without using a nonvolatile memory. As a result, the shortage of the capacity of the nonvolatile memory can be avoided, and the reset process of the circuit disconnection information recorded in the nonvolatile memory can be made unnecessary. Even when the isolation devices 220, 224 themselves malfunction, the circuit disconnected state can be reliably detected by executing the processing according to the flowchart shown in FIG. 4. Since the circuit disconnected state can be detected by updating the program of the control device 12, an increase in cost is suppressed.

[Description of Operating/Non-Operating States of Isolation Devices 220, 224 with Timing Chart (Waveform Diagram)]

Figure 5:
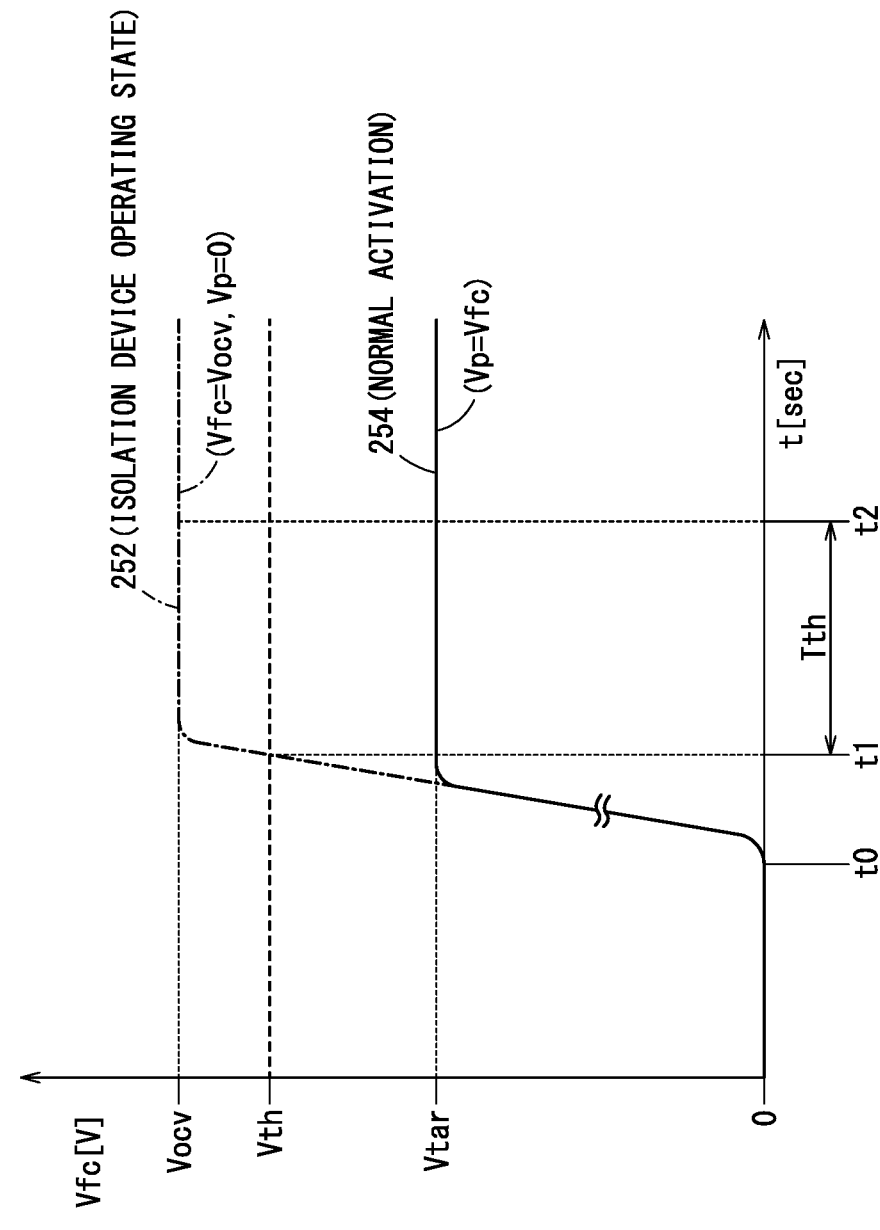
FIG. 5 is a timing chart for explaining the start-up operation of the fuel cell system.

FIG. 5 is a timing chart illustrating an example of the operation of the fuel-cell-applied system 10 including the fuel cell system 14 described with reference to the flowchart of FIG. 4. In FIG. 5, characteristics 252 indicate start-up characteristics of the generated voltage Vfc when the isolation devices 220, 224 are in the operating state. Characteristic 254 indicate startup characteristics of the generated voltage Vfc at the time of normal start-up operation when the isolation devices 220, 224 are in the non-operating state.

At a time point t0 (corresponding to step S1) when the power switch 70 is switched from the OFF state to the ON state, the fuel cell system 14 is started (corresponding to step S2). Thereafter, it is determined whether or not the voltage difference (Vfc–Vp) between the power generation voltage Vfc and the input voltage Vp is larger than the threshold voltage Vth (corresponding to step S3).

When it is larger (time point t1 in FIG. 5), it is assumed that the isolation devices 220, 224 are in the operating state (circuit disconnected state), and the disconnection flag Ff indicating the blown state of the isolation device 220 is temporarily set to Ff=1 (corresponding to step S5).

Further, from the time point t1 to a time point t2 at which the predetermined time Tth elapses, the process of determining whether or not the voltage difference (Vfc–Vp) between the power generation voltage Vfc and the input voltage Vp is larger than the threshold-voltage Vth is continued (step S6: NO→step S3: YES→step S5→step S6).

When the voltage difference (Vfc–Vp) is greater than the threshold voltage Vth at the time point t2 when the threshold time Tth has elapsed (step S6: YES), it is confirmed that the isolation devices 220, 224 are in the blown state (corresponding to step S7), and the start-up operation of the fuel cell system 14 is stopped (corresponding to step S8).

[Modifications]

The above-described embodiment can be modified in the following manner.

In the drawings referred to below, the same components as those of the above-described embodiment are denoted by the same reference numerals, and only different portions will be described.

[Configuration]

Figure 6:
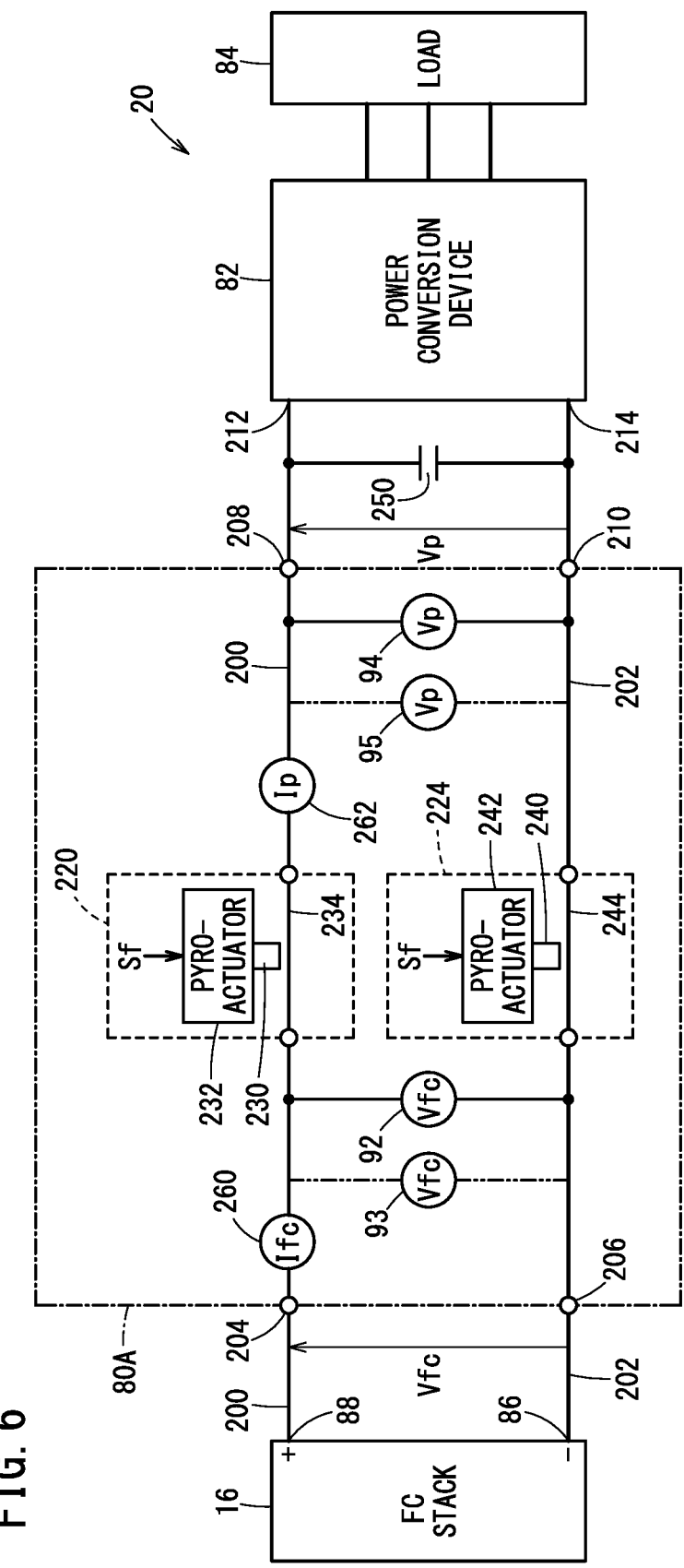
FIG. 6 is a circuit block diagram illustrating a detailed circuit configuration (isolation device not operated) of the stack sensor board of the fuel cell system according to a modification with a capacitor inserted between input terminals of s power conversion device.

FIG. 6 is a circuit block diagram illustrating a detailed circuit configuration of a stack sensor board 80A of a fuel cell-applied system 10 according to a modification (when the isolation devices 220, 224 are in a non-operating state).

Figure 7:
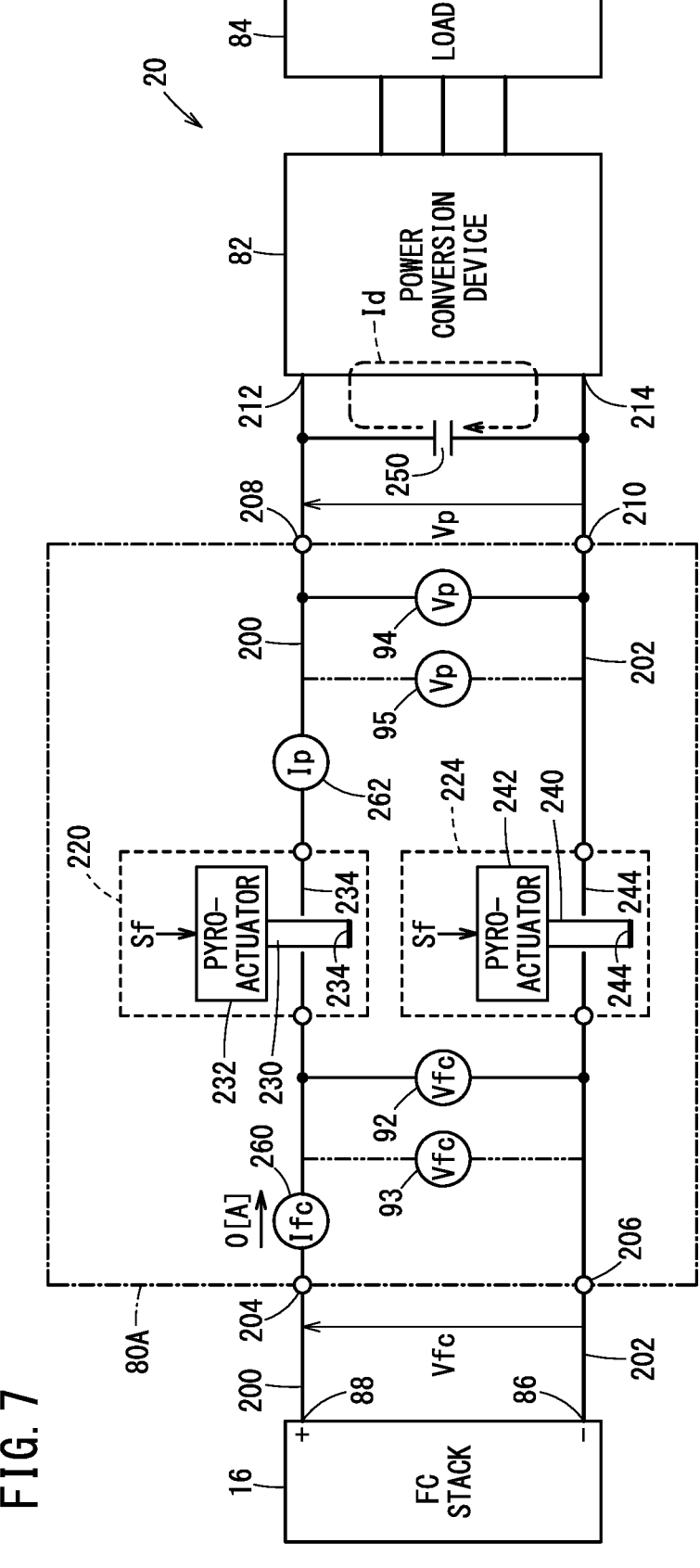
FIG. 7 is a circuit block diagram illustrating a detailed circuit configuration (isolation device operated) of the stack sensor board of the fuel cell system according to the modification with the capacitor inserted between the input terminals of the power conversion device.

FIG. 7 is a circuit block diagram illustrating a detailed circuit configuration of the stack sensor board 80A of the fuel cell-applied system 10 according to a modification (when the isolation devices 220, 224 are in an operating state).

In the fuel-cell-applied system 10 of the modification, a capacitor 250 is disposed between the positive electrode conductor 200 and the negative electrode conductor 202 near the input terminals 212, 214 of the power conversion device 82. The capacitor 250 has a relatively large capacitance value and smoothens the input voltage Vp (when the power generation voltage Vfc is applied). Further, the capacitor 250 reduces noise voltage superimposed on the input voltage Vp.

In the stack sensor board 80A of the fuel-cell-applied system 10 according to the modification, a current sensor 260 (first detection unit, first detector) is inserted in the positive electrode conductor 200 near the positive electrode terminal 88 of the fuel cell stack 16. The current sensor 260 detects (measures) a current flowing through the positive electrode conductor 200, that is, a generated current Ifc.

In the stack sensor board 80A of the fuel-cell-applied system 10 according to the modification, a current sensor 262 (second detection unit, second detector) is inserted in the positive electrode conductor 200 near the input terminal 212 of the power conversion device 82. The current sensor 262 detects (measures) a current flowing through the positive electrode conductor 200, that is, a generated current Ifc, as an input current Ip of the power conversion device 82.

The current sensor may be inserted into the negative electrode conductor 202. A redundant arrangement may be provided for both the positive electrode conductor 200 and the negative electrode conductor 202.

[Operation]

Figure 8:
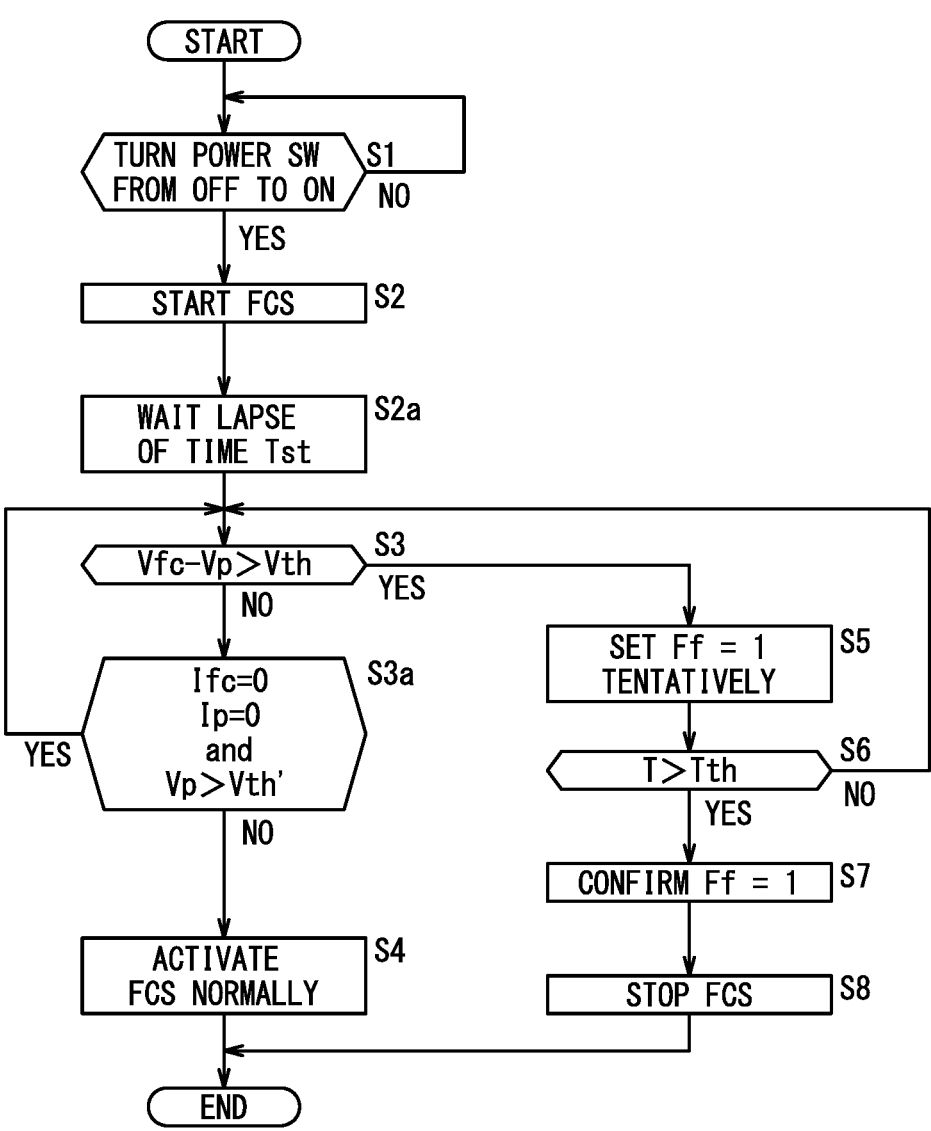
FIG. 8 is a flowchart for explaining a start-up operation of the fuel cell system according to the modification.

FIG. 8 is a flowchart for explaining an operation at the start-up of the fuel-cell-applied system 10 according to the modification. In the flowchart of this modification, compared to the flowchart of FIG. 4, a waiting time process of step S2a is added between step S2 and step S3, and a determination process of step S3s is added between step S3: "NO" and step S4.

There is a case where the power switch 70 is turned off after a collision, and then immediately turned on. In this case, since the capacitor 250 has been charged, electric charge remains in the capacitor 250 in an accumulated state.

It is assumed that the generated voltage Vfc remains at both ends of the capacitor 250 in a state in which electric charge is accumulated in the capacitor 250. The remaining generated voltage Vfc is referred to as an initial voltage Vint (Vp=Vint). The initial voltage Vint has a value lower than the open circuit voltage Vocv (Vint<Vocv).

In this case, the input voltage Vp detected (measured) by the voltage sensor 94 is Vp≈Vint, which is equal to the power generation voltage Vfc immediately before the collision, even when the isolation devices 220, 224 are in the operating state (circuit disconnected state, see FIG. 7).

Therefore, the determination "(Vfc−Vp)>Vth" in step S3 is not established (step S3: NO).

Therefore, in step S2a, the control device 12 waits until a time point t1' at which a predetermined time (waiting time) Tst has elapsed from the start time point t0 of step S2. The predetermined time Tst is set to a time obtained by adding a slight redundant time to a longer one of a first time and a second time described below. The first time is a time during which the power generation voltage Vfc increases from 0 volts to the target power generation voltage Vtar at the start-up in a case where the isolation devices 220, 224 are not operated. The second time period is a time period during which the initial voltage Vint is reduced to a sufficiently small predetermined voltage Vth' at the start-up in a case where when the isolation devices 220, 224 are operated.

Figure 9:
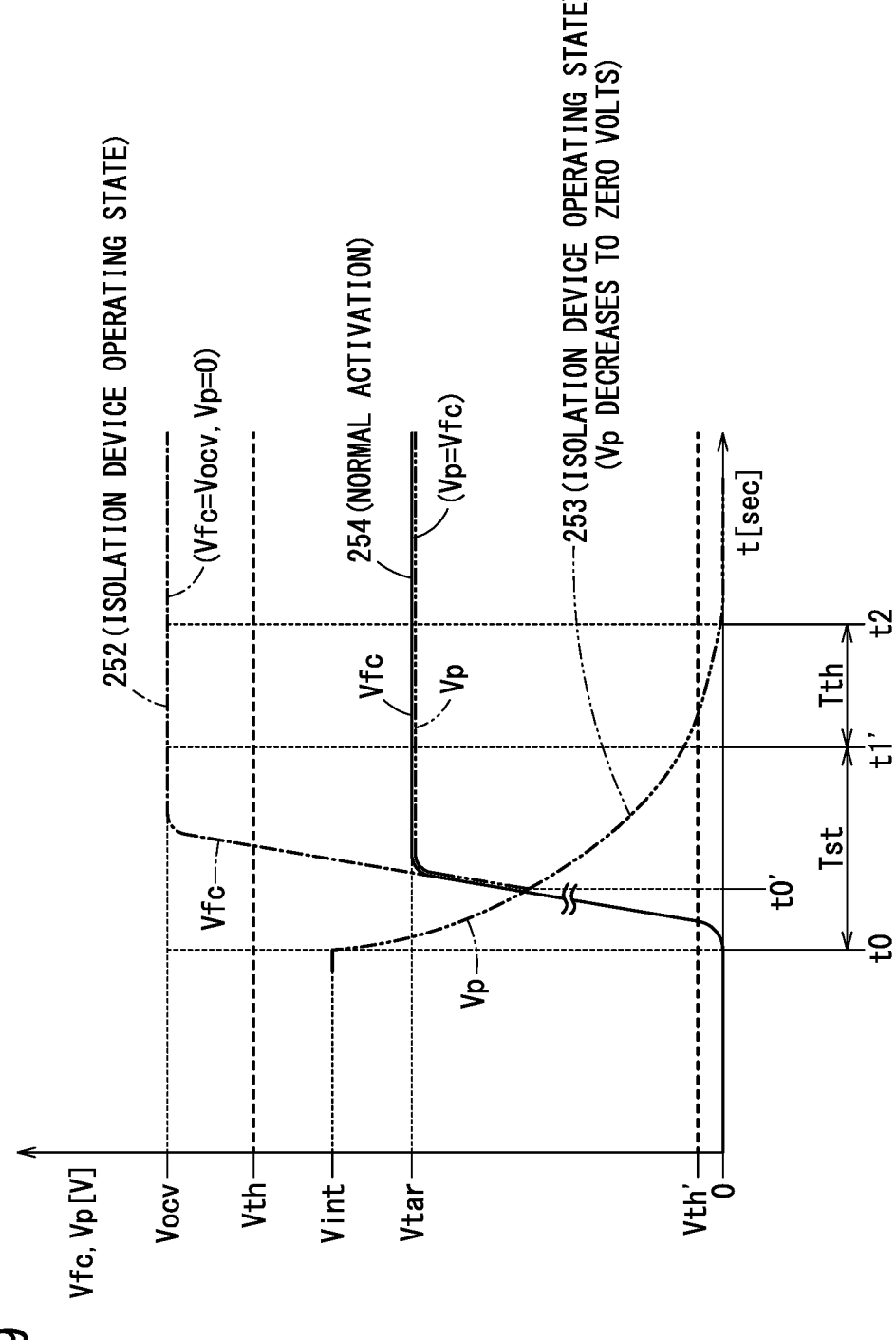
FIG. 9 is a timing chart for explaining the start-up operation of the fuel cell system according to the modification.

FIG. 9 is a timing chart illustrating the predetermined time Tst, the initial voltage Vint, and the predetermined voltage Vth' in the timing chart of FIG. 5. In FIG. 9, characteristics 253 indicate start-up characteristics when the input voltage Vp makes a decreasing transition from the initial voltage Vint when the isolation devices 220, 224 are in the operating state. Characteristics 254 indicate start-up characteristics of the input voltage Vp when the isolation devices 220, 224 are in the non-operating state in which the input voltage Vp reverses a decreasing trend to an increase trend at a time point t0'.

Next, in step S3a, the control device 12 determines whether or not the following three conditions are simultaneously satisfied with reference to the generated current Ifc, the input current Ip, the generated voltage Vfc, and the input voltage Vp measured by the current sensors 260, 262 and the voltage sensors 92, 94. Three Conditions are: Ifc=0; Ip=0; and Vp>Vth'.

The electric charge accumulated in the capacitor 250 is naturally discharged at an input resistance value of the power conversion device 82 as shown in a current path of discharge current Id in FIG. 7 immediately after the isolation devices 220, 224 cut the electrical connection. Due to the natural discharge, the voltage between the terminals of the capacitor 250, that is, the input voltage Vp gradually decreases.

Therefore, immediately after the isolation devices 220, 224 are brought into the blown state, in step S2a, even if the predetermined time Tst has elapsed and the generated voltage Vfc exceeds the target generated voltage Vtar, the generated current Ifc and the input current Ip have 0 values as Ifc=0 and Ip=0, but the input voltage Vp is Vp>Vth'. That is, because the determination in step S3a is established (step S3a: YES), the process returns to step S3.

If the three conditions in step S3a are not satisfied, it is determined that the isolation devices 220, 224 are in the non-operating state, and the fuel cell system 14 is normally activated in step S4.

During repetition of the cycle of step S3: NO→step S3a: YES→step S3, the determination of step S3 becomes established (step S3: YES).

Next, in step S5, assuming that the isolation devices 220, 224 are in the operating state (circuit non-conducting state), the disconnection flag Ff indicating the blown state of the isolation device 220 is tentatively set to Ff=1.

Thereafter, when step S6 is established after repeating step S6: NO→step S3: YES→step S5, it is determined that the isolation devices 220, 224 are in the operating state (circuit disconnected state) in step S7. In this case, the disconnection flag Ff indicating the blown state of the isolation device 220 as Ff=1 is made final. Next, in step S8, the air pump 26 is stopped, the shut-off valve of the hydrogen tank 18 is closed, and the fuel cell system 14 is stopped.

INVENTION THAT CAN BE UNDERSTOOD FROM EMBODIMENT AND MODIFICATIONS

Next, the invention understood from the above embodiment and modifications will be described below. It should be noted that, for ease of understanding, some of constituent elements are labelled with the reference numerals of those used in the embodiment and modifications, but the present invention is not limited to such constituent elements labelled with the reference numerals.

The fuel cell system 14 according to the present invention includes the fuel cell, the control device 12 configured to control power generation of the fuel cell, the power conversion device 82 configured to convert power generated by the fuel cell into power for input to the load, the isolation device 220, 224 configured to irreversibly disconnect electrical connection between the fuel cell and the power conversion device 82, a first detection unit (first detector) configured to detect the output power state of the fuel cell, and the second detection unit (second detector) configured to detect the input power state of the power conversion device 82, wherein the control device 12 detects the disconnected state of the electrical connection caused by the isolation device 220, 224 on the basis of the output power state and the input power state detected by the first detection unit (first detector) and the second detection unit (second detector).

With this configuration, it is possible to detect the irreversibly disconnected state of the electrical connection between the fuel cell and the power conversion device 82 (circuit disconnected state), without using the nonvolatile memory. As a result, the shortage of the capacity of the nonvolatile memory can be avoided, and the reset process of the circuit disconnection information recorded in the nonvolatile memory can be made unnecessary. The circuit disconnected state is reliably detectable even when the isolation device 220, 224 itself malfunctions.

Further, in the fuel cell system 14, the control device 12 stops start-up operations of the fuel cell system 14 in a case where the disconnected state of the electrical connection caused by the isolation devices 220, 224 is detected at the start-up of the fuel cell system 14.

Thus, the fuel cell system 14 can be prohibited from proceeding to the normal start-up operations in the state in which the electrical connection is disconnected.

Furthermore, in the fuel cell system 14, the control device 12 may determine that the electrical connection state is the disconnected state when the voltage difference between the output voltage of the fuel cell as the power state detected by the first detection unit (first detector) and the input voltage of the power conversion device 82 as the power state detected by the second detection unit (second detector) is equal to or greater than the threshold voltage.

Thus, it can be easily detected that the output power of the fuel cell is not supplied to the input of the power conversion device 82.

In the fuel cell system 14, when the capacitor 250 is provided between the input terminals 212, 214 of the power conversion device 82, the first detection unit (first detector) is formed of the first voltage sensor (voltage sensor 92) and the first current sensor (current sensor 260), and the second detection unit (second detector) is formed of the second voltage sensor (voltage sensor 94) and the second current sensor (current sensor 262), the control device 12 can detect the disconnected state of the electrical connection by the isolation device 220, 224 based on the behavior of the input voltage of the power conversion device 82 detected by the second voltage sensor in the case where the current flow cannot be confirmed by both the first current sensor and the second current sensor.

The present invention is not limited to the embodiments described above, and various configurations can be adopted without departing from the gist of the present invention.

What is claimed is:

1. A fuel cell system comprising: a fuel cell; a control device configured to control power generation of the fuel cell; a power conversion device configured to convert power generated by the fuel cell into power for input to a load; an isolation device configured to irreversibly disconnect electrical connection between the fuel cell and the power conversion device; a first detector connected between input terminals of the isolation device and configured to detect an output power state form the fuel cell; and a second detector connected between output terminals of the isolation device and configured to detect an input power state to the power conversion device, wherein the control device sets an open circuit voltage to a predetermined value determined to cause deterioration of the fuel cell and sets a target power generation voltage to a value less than the open circuit voltage, the first detector detects, as the output power state, a power generation voltage generated between a positive electrode terminal and a negative electrode terminal of the fuel cell, the second detector detects, as the input power state, an input voltage between input terminals of the power conversion device, the input terminals including one input terminal electrically connected to the positive electrode terminal and another input terminal electrically connected to the negative electrode terminal, the control device is programmed to detect a disconnected state of the electrical connection caused by the isolation device on a basis of a voltage difference between the power generation voltage and the input voltage respectively detected by the first detector and the second detector, the control device is programmed to determine the disconnected state of the electrical connection on a condition that the voltage difference is equal to or greater than a threshold voltage that is set to a voltage value between the target power generation voltage and the open circuit voltage of the fuel cell, wherein the control device is configured to stop a start-up operation of the fuel cell system in a case where the disconnected state of the electrical connection caused by the isolation device is detected during the start-up operation of the fuel cell system.

2. The fuel cell system according to claim 1, further comprising a capacitor disposed between the input terminals of the power conversion device, wherein the first detector is formed of a first voltage sensor configured to detect the power generated voltage generated by the fuel cell and a first current sensor configured to detect a generated current generated by the fuel cell, and the second detector is formed of a second voltage sensor configured to detect the input voltage between input terminals of the power conversion device and a second current sensor configured to detect an input current to the power conversion device, and the control device is configured to detect the disconnected state of the electrical connection caused by the isolation device on a basis of a behavior of the input voltage to the power conversion device detected between terminals of the capacitor by the second voltage sensor in a case where an electric current flow is undetectable by the first current sensor and the second current sensor.

* * * * *